United States Patent
Camargo et al.

(10) Patent No.: US 12,118,481 B2
(45) Date of Patent: Oct. 15, 2024

(54) SCHEDULED TEMPORARY RENTAL PROPERTY ACCESS

(71) Applicant: Alarm.com Incorporated, Tysons, VA (US)

(72) Inventors: Fabian Emilio Philipe Camargo, Falls Church, VA (US); Michael Montgomery Brophy, Arlington, VA (US)

(73) Assignee: Alarm.com Incorporated, Tysons, VA (US)

( * ) Notice: Subject to any disclaimer, the term of this patent is extended or adjusted under 35 U.S.C. 154(b) by 721 days.

(21) Appl. No.: 17/227,593

(22) Filed: Apr. 12, 2021

(65) Prior Publication Data

US 2021/0232983 A1 Jul. 29, 2021

Related U.S. Application Data

(63) Continuation of application No. 15/639,046, filed on Jun. 30, 2017, now Pat. No. 10,977,583.

(Continued)

(51) Int. Cl.
*G06Q 10/02* (2012.01)
*G07C 9/00* (2020.01)
(Continued)

(52) U.S. Cl.
CPC ......... *G06Q 10/02* (2013.01); *G07C 9/00174* (2013.01); *G07C 9/00309* (2013.01);
(Continued)

(58) Field of Classification Search
CPC ............ G07C 9/00904; G07C 9/00174; G07C 9/00309; G07C 9/00896; G07C 2009/00277; G06Q 10/02
(Continued)

(56) References Cited

U.S. PATENT DOCUMENTS 6,971,029 B1    11/2005   Avery, IV et al.
7,116,211 B1    10/2006   Parker
(Continued)

FOREIGN PATENT DOCUMENTS

CN   105488607         4/2016
EP    2584538 A1 *    4/2013   ......... G07C 9/00031
(Continued)

OTHER PUBLICATIONS

ABC News, "Faulty Hotel Locks Demonstrated by ABC News Report", Oct. 21, 2012, abcnews.go.com, 3 pages (Year: 2012).*

(Continued)

*Primary Examiner* — Shannon S Campbell
*Assistant Examiner* — Freda A Nelson
(74) *Attorney, Agent, or Firm* — Fish & Richardson P.C.

(57) ABSTRACT

In some implementations, a system is capable of generating and distributing access credentials to users that access a rental property for a limited time period. Users can be provided with access to the rental property through an application or webpage portal without creating a new user account or user login for the application. For example, a user can be granted access to control electronic devices associated with a monitoring system of a rental property without creating a new user account with the monitoring system. Techniques described herein enable such users to more easily access, for example, rental property information that is associated with a monitoring system of the rental property. In this manner, access credentials can be distributed to users through any suitable means, e.g., through email or SMS, and used to temporarily authenticate users.

20 Claims, 9 Drawing Sheets

Related U.S. Application Data

(60) Provisional application No. 62/356,679, filed on Jun. 30, 2016.

(51) Int. Cl.

| | | |
|---|---|---|
| *H04L 9/40* | (2022.01) | |
| *H04W 4/80* | (2018.01) | |
| *H04W 12/06* | (2021.01) | |
| *H04W 12/084* | (2021.01) | |
| *H04W 12/61* | (2021.01) | |
| *H04W 12/64* | (2021.01) | |

(52) U.S. Cl.
CPC ..... *G07C 9/00571* (2013.01); *G07C 9/00896* (2013.01); *H04L 63/083* (2013.01); *H04L 63/108* (2013.01); *H04W 4/80* (2018.02); *H04W 12/06* (2013.01); *H04W 12/084* (2021.01); *H04W 12/61* (2021.01); *H04W 12/64* (2021.01); *G07C 9/00904* (2013.01); *G07C 2209/08* (2013.01)

(58) Field of Classification Search
USPC .............................................. 705/5; 340/5.28
See application file for complete search history.

(56) References Cited

U.S. PATENT DOCUMENTS

| | | | |
|---|---|---|---|
| 7,170,998 | B2 | 1/2007 | McLintock et al. |
| 7,196,610 | B2 | 3/2007 | Straumann et al. |
| 8,035,480 | B2 | 10/2011 | Woodard et al. |
| 8,437,740 | B2 | 5/2013 | Despain et al. |
| 8,902,042 | B2 | 12/2014 | Davis et al. |
| 8,957,757 | B1 | 2/2015 | Le Burge et al. |
| 9,230,374 | B1 | 1/2016 | Burge et al. |
| 9,286,741 | B2 * | 3/2016 | Adolfsson ............. H04W 12/08 |
| 9,361,771 | B2 | 6/2016 | Comerford et al. |
| 9,444,805 | B1 * | 9/2016 | Saylor ..................... H04L 63/08 |
| 9,514,584 | B1 | 12/2016 | Burge et al. |
| 9,710,978 | B1 | 7/2017 | Sequeira et al. |
| 9,824,559 | B2 | 11/2017 | Patterson et al. |
| 9,831,724 | B2 | 11/2017 | Copeland et al. |
| 9,923,879 | B1 | 3/2018 | Ziraknejad et al. |
| 9,996,999 | B2 | 6/2018 | Conrad et al. |
| 10,057,227 | B1 | 8/2018 | Hess et al. |
| 10,325,426 | B2 | 6/2019 | Schmidt-Lackner et al. |
| 10,977,583 | B2 | 4/2021 | Camargo et al. |
| 2002/0099945 | A1 | 7/2002 | McLintock et al. |
| 2003/0151493 | A1 | 8/2003 | Straumann et al. |
| 2004/0022422 | A1 | 2/2004 | Yamauchi et al. |
| 2004/0049413 | A1 | 3/2004 | Momma et al. |
| 2004/0219903 | A1 | 11/2004 | Despain et al. |
| 2005/0264397 | A1 * | 12/2005 | Coelho .................. G06Q 10/02 340/5.28 |
| 2007/0096870 | A1 | 5/2007 | Fisher |
| 2007/0193834 | A1 | 8/2007 | Pai et al. |
| 2007/0290797 | A1 | 12/2007 | Harkins et al. |
| 2008/0215384 | A1 | 9/2008 | Mulholland et al. |
| 2008/0246587 | A1 | 10/2008 | Fisher |
| 2009/0030718 | A1 | 1/2009 | Bengson |
| 2009/0299777 | A1 | 12/2009 | Silberman |
| 2010/0171589 | A1 * | 7/2010 | Haberli ................ H04B 13/005 70/91 |
| 2010/0283579 | A1 | 11/2010 | Kraus et al. |
| 2011/0053557 | A1 | 3/2011 | Despain et al. |
| 2011/0082746 | A1 | 4/2011 | Rice et al. |
| 2011/0320372 | A1 | 12/2011 | Woodard et al. |
| 2012/0246024 | A1 | 9/2012 | Thomas et al. |
| 2012/0280783 | A1 | 11/2012 | Gerhardt et al. |
| 2013/0024222 | A1 | 1/2013 | Dunn |
| 2013/0229259 | A1 | 9/2013 | Huang |
| 2013/0347073 | A1 | 12/2013 | Bryksa et al. |
| 2014/0129113 | A1 | 5/2014 | Van Wiemeersch et al. |
| 2014/0253285 | A1 | 9/2014 | Menzel |
| 2015/0109104 | A1 | 4/2015 | Fadell et al. |
| 2015/0109112 | A1 * | 4/2015 | Fadell .................. G08B 19/005 340/328 |
| 2015/0193864 | A1 | 7/2015 | Allison et al. |
| 2015/0194000 | A1 * | 7/2015 | Schoenfelder ..... G07C 9/00309 340/5.61 |
| 2016/0048934 | A1 | 2/2016 | Gross |
| 2016/0080390 | A1 | 3/2016 | Kalb et al. |
| 2016/0125357 | A1 | 5/2016 | Hall et al. |
| 2016/0163138 | A1 | 6/2016 | Turner et al. |
| 2017/0193720 | A1 | 7/2017 | Eyring et al. |
| 2018/0012043 | A1 * | 1/2018 | Kupiec ............... H04L 63/0428 |

FOREIGN PATENT DOCUMENTS

| | | | |
|---|---|---|---|
| EP | 2817727 A4 | 10/2015 | |
| EP | 2956902 | 12/2015 | |
| WO | WO 02/08551 | 1/2002 | |
| WO | WO2004077848 A2 | 9/2004 | |
| WO | WO2009088901 A1 | 7/2009 | |
| WO | WO-2012116400 A1 * | 9/2012 | ......... G07C 9/00571 |
| WO | WO2014144628 A2 | 9/2014 | |
| WO | WO2015123345 A1 | 8/2015 | |

OTHER PUBLICATIONS

"Why The igloohome Smart Digital Lock Is Smarter Than The Rest", Apr. 3, 2016, igloohome.co, 7 pages (Year: 2016).*
EP Office Action in European Application No. 17821363.3, dated Sep. 21, 2022, 7 pages.
AU Examination Report in Australian Appln. No. 2017286911, dated May 3, 2023, 3 pages.
[No Author Listed], "Electronic Airbnb Smart Locks For Your Property," Guesty Marketing Team, Guesty.com, Apr. 6, 2015, 14 pages.
Extended European Search Report in European Application No. 17821363.3, dated Jun. 7, 2019, 12 pages.
EP Office Action in European Application No. 17821363.3, dated Mar. 23, 2022, 11 pages.
Ho et al., "Smart Locks: Lessons for Securing Commodity Internet of Things Devices," Mar. 12, 2016, Electrical Engineering and Computer Sciences University of California at Berkeley, Technical Report No. UCB/EECS-2016-11, retrieved from: URL<www.eecs.berkeley.edu/Pubs/TechRpts/2016/EECS-2016-11.html>, 17 pages.
International Search Report and Written Opinion of the International Searching Authority in International Application No. PCT/US2017/040304, dated Sep. 15, 2017, 6 pages.

* cited by examiner

SCHEDULED TEMPORARY RENTAL PROPERTY ACCESS

CROSS-REFERENCE TO RELATED APPLICATIONS

This application is a continuation of U.S. application Ser. No. 15/639,046, filed Jun. 30, 2017, now allowed, which claims the benefit of U.S. Provisional Application No. 62/356,679, filed Jun. 30, 2016, and titled "Scheduled Temporary Rental Property Access." The complete disclosures of all of the above patent applications are hereby incorporated by reference in their entirety for all purposes.

TECHNICAL FIELD

This disclosure application relates generally to rental property management technology.

BACKGROUND

Properties are often temporarily available for rent to a user by a property owner. In some instances, a property owner may provide a rental property listing to advertise the property to users. Once a user expresses interest in renting an available property, the property owner and the user attempt to reach an agreement on allowing the user temporary physical access to the rental property.

SUMMARY

Techniques are described for rental property management technology. For example, techniques are described to generate and distribute access credentials to users such as temporary guests or occupants that access a rental property for a limited time period. Users can be provided with access to the rental property through an application or webpage portal without creating a new user account or user login for the application. For example, a user can be granted access through an application or web portal to control electronic devices associated with a monitoring system of a rental property without creating a new user account with the monitoring system. Techniques described herein enable such users to more easily access, for example, rental property information through an application or through a webpage portal that is associated with a monitoring system of the rental property. In this manner, access credentials can be distributed to users through any suitable means, e.g., through email or SMS, and used to temporarily authenticate users without requiring that the user create a user account that enables access to the rental property.

The access credentials may be generated and distributed to users at various stages of the property rental process. In some instances, the access credential is generated after a user submits a reservation for a rental listing provided by a property administrator. In such instances, the generated access credential is initially associated with the reservation, and then distributed to the user to provide access to an application (or a webpage) to view rental property information. Alternatively, in other implementations, the access credential is pre-generated by the system once a property administrator creates the rental listing prior to any user submitting a reservation request. In such instances, the access credential is assigned and distributed to a user once she/he submits a rental reservation.

Once the access credential is distributed to a user, the access credential may be used for a variety of functions that are related to property rental. In some instances, the access credential can be used to provide easy access to property information without requiring the user to create a new account to access an application that is capable of exchanging communications with a monitoring system of the rental property. In such instances, the distributed access credential is used to authenticate the user into the application so that he/she can perform actions related to the rental property such as physically accessing the rental property or controlling electronic devices located within the property. In some implementations, user information is obtained from an external source (e.g., an existing user account associated with a rental property listing website or a rental property listing application) and associated with the distributed access credential. In such instances, the user information can be additionally used to authenticate the user into the application.

In some other instances, once the user has used the access credential to log into the application, the user can use the application to perform actions associated with the rental property. Examples of actions can include transmitting messages to the property administrator, using the application to unlock an electronic lock of the rental property to provide physical access, controlling smart appliances and/or network-enabled devices through commands transmitted from the application, among others.

In some implementations, the system may generate and provide the access credential in response to receiving an indication that the property administrator has approved the user to rent the corresponding property. The granted access credential can also be used to control the provisioning of services that are associated with the property rental to the user.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

In the drawings, like reference numbers represent corresponding parts throughout.

DETAILED DESCRIPTION

Figure 1:
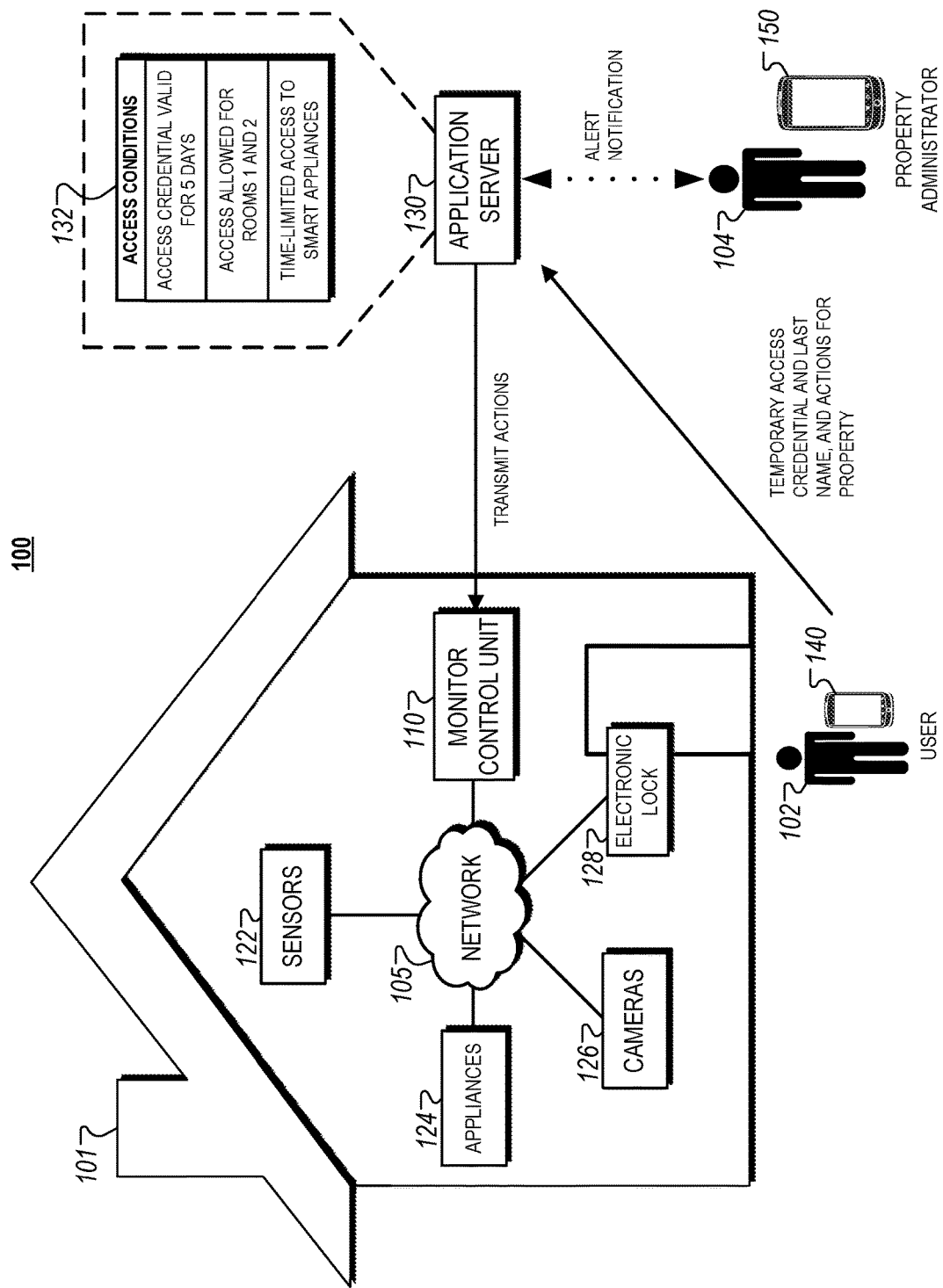
FIG. 1 is a schematic diagram that illustrates an example of a system that enables temporary rental property access.

In general, techniques are described to generate and distribute access credentials to users (e.g., users or users) to more easily access rental property information on an application without requiring the users to create a new account or user login for the application. Each access credential may be associated with a particular rental property and associated with a set of access conditions that are specified by a property administrator.

The access credentials may be generated and distributed to users at various stages of the property rental process. In some instances, the access credential is generated after a user submits a reservation for a rental listing provided by a property administrator. In such instances, the generated access credential is initially associated with the reservation, and then distributed to the user to provide access to an application (or a webpage) to view rental property information. Alternatively, in other implementations, the access credential is pre-generated by the system once a property administrator creates the rental listing prior to any user submitting a reservation request. In such instances, the access credential is assigned and distributed to a user once she/he submits a rental reservation.

Once the access credential is distributed to a user, the access credential may be used for a variety of functions that are related to property rental. In some instances, the access credential can be used to provide easy access to property information without requiring the user to create a new account to access an application that is capable of exchanging communications with a monitoring system of the rental property. In such instances, the distributed access credential is used to authenticate the user into the application so that he/she can perform actions related to the rental property such as physically accessing the rental property or controlling electronic devices located within the property. In some implementations, user information is obtained from an external source (e.g., an existing user account associated with a rental property listing website or a rental property listing application) and associated with the distributed access credential. In such instances, the user information can be additionally used to authenticate the user into the application.

As described herein, a "property administrator" refers to an individual or an entity that controls access to a rental property. For example, in some instances, a property administrator may be a property owner that retains property title to the property to be rented. In other instances, the property administrator may be an authorized agent of the property owner that manages and rents the property on behalf of the property owner. The property administrator specifies a set of access conditions that are associated with the rental of a property. For example, the property administrator may specify the cost of rental, time periods of availability, or services that are offered along with the property rental.

A "user" (or "guest" or "occupant") refers to an individual that requests to rent a property that is made available by the property administrator. The user can submit a rental requests through various mediums such as sending a direct email to the property administrator, placing a request through a property rental webpage, and/or through an application that provides property rental services.

An "access credential" refers to a credential that is associated with a rental property and provides one or more prospective users with temporary access to the rental property with permission from a property administrator. When an access credential is initially generated for a rental property, property information and one or more access conditions that are specified by the property administrator are also associated with the access credential. Once a rental property receives interest from a user through an applicable medium (e.g., through property rental website, property rental appli-cation, etc.) and the property administrator approves of a user's rental request, the access credential can be provided to the user to enable access to rental property services through a separate application without requiring user account creation and/or information submission for the application. In this regard, once a rental agreement has been entered into between a property administrator and a user, the access credential may then be assigned to the user to allow for provisioning of various rental services. In some instances, the access credential can be a uniquely generated personal identifier number (PIN) with a specified number of alphanumeric characters.

"Access credential activation" refers to a process where a user enters a distributed access credential into a login screen of an application, or some other type of interface, to view and access information related to property rental. In some instances, the distributed access credential becomes activated once a user enters the access credential into an entry form displayed an application. After submitting the access credential, the user may then view pertinent information associated with the rental property, and/or transmit instructions to devices associated with the rental property to perform particular actions as described in more detail below.

In addition, an access credential may become inactive in certain situations. For example, an access credential may be associated with an access condition that specifies a fixed time period in which the access credential remains valid. In this example, the access credential may only be activated within the fixed time period, and becomes inactive after expiration of the fixed time period. In another example, an access credential may be inactivated after one or more events specified by the property administrator. For instance, different access credentials may be distributed to different users who have each submitted rental reservations for the same property. In this instance, each respective access credential may be active until one user forms a rental agreement with the property administrator, which then causes the other access credentials to become invalid because the rental property is no longer available for rent.

"Access credential enablement" refers to a process by which a distributed access credential is used by a prospective user to physically access the rental property after forming a rental agreement with the property administrator. For instance, in some instances, after a user has activated the access credential by logging into the application, the user may then use the application to transmit an instruction to unlock a front door of the rental property when he/she initially arrives at the property. In this instance, the access credential becomes enabled once the user performs actions that indicate that he/she has obtained possession over the rental property. In this regard, an access credential may be activated but disabled after the user forms a rental agreement but prior to the start of the specified rental period, whereas an access credential may be activated and enabled once the user actually obtains possession over the rental property to initiate the rental period.

In some instances, an enabled access credential allows the user to perform a greater number of actions on the application compared to an activated (but not enabled) access credential. For instance, because an enabled access credential indicates that the user has physically obtained possession over the rental property, once an access credential is enabled, the application may present the user with options to transmit instructions to connected devices and/or appliances within the property to perform certain actions. Examples of actions may include unlocking an electronic lock of the property, operating smart appliances within the property, among others.

"Access conditions" refer to features, attributes, or limitations of the property rental that are associated with the access credential and specified by a property administrator. For instance, the access conditions can specify a time period for which access credential remains valid. In other instances, the access conditions may specify limitations on the property rental that are imposed on and agreed upon by the user within a rental agreement. For example, the access conditions may specify geographic rental restrictions (e.g., specific rooms that are accessible to the user), time-based rental restrictions (e.g., use of particular appliances within the property during a specified period of time), or actions during the rental that are strictly prohibited by the property administrator. As described in more detail below, access conditions specified by a property administrator may be associated with a distributed access credential to effectively enforce rental restrictions without requiring a property owner's presence.

FIG. 1 illustrates a diagram of an example of a property management system 100 that is associated with a property 101. Although this disclosure is written in the context of controlling access to rental property, systems and techniques described herein can also be used for controlling access to properties for purchase (e.g., condos, houses, and/or commercial headquarters). Although FIG. 1 illustrates one property for brevity, the application server 130 may also manage electronic locks and energy consuming devices for multiple properties and/or structures. For example, the application server 130 may communicate directly with the monitor control unit 110 or through other communications media and protocol (e.g., through the network 105, over Bluetooth, Zigbee, etc.).

The system 100 may include a monitor control unit 110, sensors 122, appliances 124, cameras 126, an electronic lock 128, and an application server 130 connected over a network 105. The network 105 enables the monitor control unit 110, sensors 122, appliances 124, cameras 126, the electronic lock 128, and the application server 130 to exchange data communications related to rental reservations and/or information related to the rental reservations. The network 105 also enables the system 100 to maintain data that defines a set of access conditions associated with an access credential that is distributed to a particular user that requests to rent the property 101.

In general, the architecture of the system 100 enables a property administrator 104 to rent the property 101 to a user 102 by use of a distributed access credential that is associated with the property 101 to the user 102, and specification of a set of access conditions 132 associated with property rental. The property administrator 104 may use a rental property management portal to specify the set of access conditions 132, which are then stored on the application server 130. The rental property management portal is described more particularly with respect to FIGS. 5A-5B.

As described above, the access credentials associated with rental property maybe generated and distributed in a variety of ways during a property rental process. In some implementations, the access credential is generated in response to a user submitting a reservation to the rent the property 101 on a rental listing provided by the property administrator. In this example, an access credential may be generated for each reservation for the property 101, and then distributed to the corresponding users that submitted each reservation. Once each user receives the distributed access credential, the user may then use the distributed access credential to view rental property information on an application that may independent from the rental listing.

Alternatively, in other implementations, the access credential may be pre-generated by the system once the property administrator creates a new rental listing for the property 101 and prior to receiving any rental reservations from users. In these implementations, once a user submits a rental reservation in response to the rental listing, the access credentials may then be associated with the rental reservations, and distributed to the corresponding user.

Once a rental agreement and/or confirmation has been formed between the user 102 and the property administrator 104, the access credential associated with the property to be rented is then distributed to the user 102. The access credential may be distributed with the use of various communication mediums such as transmitting an email to the user, sending an SMS message to a mobile device associated with the user, initiating a system-generated telephone call to deliver the access credential to the mobile device associated with the user, among others.

When the access credential is distributed to the user, the communication may further include an instruction and/or reference to download an application on a device associated with the user. In some instances, the reference can include a deeplink to redirect the user to an application store page to download and install an application on the device. In other instances, the reference can instead be a hyperlink to a webpage that enables the user to submit the distributed access credential and other user-specific information to system 100. More particular discussions related to access credential submission and the application are described with respect to FIGS. 6A and 6B.

The distributed access credential provides a means to authenticate a user into the system 100 to obtain information related to the rental property and/or utilize services offered as a part of the rental agreement. For example, as described more particularly with respect to FIG. 6B, the access credential enables the user to use a device to transmit instructions to the system 100 of the rental property to perform particular actions. Such actions can include enabling or disabling operation of connected devices inside the rental property, locking or unlocking electronic locks to gain access to regions within the property, among others. Greater discussion of functions of the particular components of the system 100 in relation to the access credentials distributed to users is provided below.

After the access credentials are generated and distributed to users, there may be different "states" associated with the access credentials. For instance, an access credential may initially be "inactive" prior to the user using the access credential to log into the application as described above. Once the user logins into the application using the access credential, its associated state may change to "active" to reflect that the user has obtained access to rental property information that is provided on the application. As described above, an "active" access credential may remain in such a state for a fixed time period (e.g., as defined by an associated access condition), or until a specified event takes place to revert the access credential to an inactive state (e.g., inactivating the distributed access credentials to other users for a rental property once one of the users has formed a rental agreement with the property administrator). Once the user obtains physical possession over the property, the state of the access credential is adjusted to "enabled," indicating that the start of the actual rental period. As described more particularly below, an "enabled" access credential may provide the user with a greater set of features on the application compared to an "active" access credential since the user has started the rental period.

The network 105 is configured to enable exchange of electronic communications between devices connected to the network 105. For example, the network 105 may be configured to enable exchange of electronic communications between the monitor control unit 110, the sensors 122, the appliances 124, the cameras 126, the electronic lock 128 and the application server 130. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 105 may include multiple networks or subnetworks, each of which may include, for example, a wired or wireless data pathway.

The network 105 may also include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitor control unit 110 may be an electronic device that coordinates and/or monitors the operations of the components of the system 100 through a set of data transmissions with each of the components of the system 100. The monitor control unit 110 includes a controller and a network module. The controller is configured to control a system 100 (e.g., a home alarm or security system) that includes the monitor control unit 110. In some examples, the controller may include a processor or other control circuitry configured to execute instructions of a program that controls operation of an alarm system. In these examples, the controller may be configured to receive input from sensors, detectors, or other devices included in the alarm system and control operations of devices included in the alarm system or other household devices (e.g., a thermostat, an appliance, lights, etc.). For example, the controller may be configured to control operation of the network module included in the monitor control unit 110.

The network module is a communication device configured to exchange communications over the network 105. The network module may be a wireless communication module configured to exchange wireless communications over the network 105. For example, the network module may be a wireless communication device configured to exchange communications over a wireless data channel and a wireless voice channel. In this example, the network module may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module may also be a wired communication module configured to exchange communications over the network 105 using a wired connection. For instance, the network module may be a modem, a network interface card, or another type of network interface device. The network module may be an Ethernet network card configured to enable the monitor control unit 110 to communicate over a local area network and/or the Internet. The network module also may be a voice-band modem configured to enable the alarm panel to communicate over the telephone lines of Plain Old Telephone Systems (POTS).

The monitor control unit 110 also may include a communication module that enables the monitor control unit 110 to communicate other devices of the system 100. The communication module may be a wireless communication module that allows the monitor control unit 110 to communicate wirelessly. For instance, the communication module may be a Wi-Fi module that enables the monitor control unit 110 to communicate over a local wireless network at the property 101. The communication module further may be a 900 MHz wireless communication module that enables the monitor control unit 110 to communicate directly with a monitor control unit. Other types of short-range wireless communication protocols, such as Bluetooth, Bluetooth LE, Zwave, ZigBee, etc., may be used to allow the monitor control unit 110 to communicate with other devices in the property 101.

In some examples, the monitor control unit 110 may include data capture and recording devices. In these examples, the monitor control unit 110 may include one or more cameras 126, one or more motion sensors, one or more microphones, one or more biometric data collection tools, one or more temperature sensors, one or more humidity sensors, one or more air flow sensors, and/or any other types of sensors that may be useful in capturing monitoring data related to the property 101 and users in the property.

The monitor control unit 110 further may include processor and storage capabilities. The monitor control unit 110 may include any suitable processing devices that enable the monitor control unit 110 to operate applications and perform the actions described throughout this disclosure. In addition, the monitor control unit 110 may include solid state electronic storage that enables the monitor control unit 110 to store applications, configuration data, collected sensor data, and/or any other type of information available to the monitor control unit 110.

The monitor control unit 110 may exchange communications with the sensors 122, the appliances 124, the cameras 126, the electronic lock 128, and the application server 130 using multiple communication links. The multiple communication links may be a wired or wireless data pathways configured to transmit signals from sensors 122, the appliances 124, the cameras 126, the electronic lock 128, and the application server 130 to the controller. The sensors 122, the appliances 124, the cameras 126, the electronic lock 128, and the application server 130 may continuously transmit sensed values to the controller, periodically transmit sensed values to the monitor control unit 110, or transmit sensed values to the monitor control unit 110 in response to a change in a sensed value.

In some implementations, the monitor control unit 110 may additionally be used to perform routine surveillance operations on a property. For instance, the monitor control unit 110 may be assigned to one or more particular properties within a geographic location and may routinely collect surveillance footage during specified time periods (e.g., after dark), which may then be transmitted to the application server 130 for transmitting back to each particular property owner. In such implementations, the property owner may receive the surveillance footage over the network 105 as a part of a service provided by a security provider that operates the application server 130. For example, transmissions of the surveillance footage collected by the monitor control unit 110 may be part of a premium security service package provided by a security provider in addition to the routine drone emergency response service.

In some implementations, the monitor control unit 110 may monitor the operation of the electronic devices of the system 100 such as sensors 122, the appliances 124, the cameras 126, the electronic lock 128, and the application server 130. For instance, the monitor control unit 110 may enable or disable the devices of the system 100 based on a set of rules associated with energy consumption, user-specified settings, and/or other information associated with the conditions near or within the property 101 where the system 100 is located. In some examples, the monitor control unit 110 may be used as a replacement to a traditional security panel (or monitor control unit) that is used to monitor and control the operations of the system 100. In other examples, the monitor control unit 110 may coordinate monitoring operations with a separate security panel of the system 100. In such examples, the monitor control unit 110 may monitor particular activities of the devices of the system 100 that are not monitored by the security panel, or monitor the operation of particular devices that are not monitoring by the security panel.

As described above, the property 101 may include various monitoring devices that are each capable of performing individual monitoring operations and/or capable to performing a set of coordinated operations based on instructions received from either the monitor control unit 110 or the application server 130. For instance, the property 101 may include the sensors 122, the appliances 124, the cameras 126, the electronic lock 128, the application server 130 and other devices that provide monitoring data associated with devices, areas, or individuals located nearby or within the premises of the property 101. As an example, the cameras 126 located on the property 101 may provide video, still images, or other monitoring data, and may provide data via a live feed, transmit data to be stored in a remote location, store data locally for review at a later time, etc. As another example, the sensors 122 located on the property 101 may include motion sensors, heat sensors, pressure sensors, resistive sensors, etc. that periodically collected sensed data indicating conditions of the property 101. The sensors 122 may communicate with the system 100 and transmit monitoring data for processing to the monitoring control unit 110. In some examples, the sensors 122 may store collected data locally or transmit monitoring data to be stored in a remote location (e.g., the application server 130).

The multiple communication links may further include a local network within the network 105. For instance, the monitor control unit 110, the sensors 122, the appliances 124, the cameras 126, the electronic lock 128, and the application server 130 may exchange data and commands over the local network as described herein. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

Referring now to the sensors 122, the system 100 may include one or more of a contact sensor, a motion sensor, a glass break sensor, an occupancy sensor, or any other type of sensor that can be included in an alarm or security system. The sensors 122 may also include an environmental sensor, such as a temperature sensor, a water sensor, a rain sensor, a wind sensor, a light sensor, a smoke detector, a carbon monoxide detector, an air quality sensor, etc. The sensors 122 may further include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 122 may include a radio-frequency identification (RFID) sensor that identifies a particular article that includes a pre-assigned RFID tag.

The appliances 124 may be home automation devices connected to the network 105 that are configured to exchange electronic communications with other devices of the system 100. The appliances 124 may include, for example, connected kitchen appliances, controllable light sources, safety and security devices, energy management devices, and/or other types of electronic devices capable of exchanging electronic communications over the network 105. In some instances, the appliances 124 may periodically transmit information and/or generated data to the monitor control unit 110 such that the monitor control unit 110 can automatically control the operation of the appliances 124 based on the exchanged communications. For example, the monitor control unit 110 may operate one or more of the appliances 124 based on a fixed schedule specified by the user. In another example, the monitor control unit 110 may enable or disable one or more of the appliances 124 based on received sensor data from the sensors 122.

The cameras 126 may be video/photographic cameras or other type of optical sensing devices configured to capture images. For instance, the cameras 126 may be configured to capture images of an area within a building monitored by the monitor control unit 110. The cameras 126 may be configured to capture single, static images of the area and also video images of the area in which multiple images of the area are captured at a relatively high frequency (e.g., thirty images per second). The cameras 126 may be controlled based on commands received from the monitor control unit 110.

The cameras 126 may be triggered by several different types of techniques. For instance, a Passive Infra Red (PIR) motion sensor may be built into the cameras 126 and used to trigger the cameras 126 to capture one or more images when motion is detected. The cameras 126 also may include a microwave motion sensor built into the camera and used to trigger the cameras 126 to capture one or more images when motion is detected. The cameras 126 may have a "normally open" or "normally closed" digital input that can trigger capture of one or more images when external sensors (e.g., the sensors 122, PIR, door/window, etc.) detect motion or other events. In some implementations, the cameras 126 receives a command to capture an image when external devices detect motion or another potential alarm event. The cameras 126 may receive the command from the controller or directly from one of the sensors 122.

In some examples, the cameras 126 trigger integrated or external illuminators (e.g., Infra Red, Z-wave controlled "white" lights, etc.) to improve image quality when the scene is dark. An integrated or separate light sensor may be used to determine if illumination is desired and may result in increased image quality.

The cameras 126 may be programmed with any combination of time/day schedules, system "arming state", or other variables to determine whether images should be captured or not when triggers occur. The cameras 126 may enter a low-power mode when not capturing images. In this case, the cameras 126 may wake periodically to check for inbound messages from the controller. The cameras 126 may be powered by internal, replaceable batteries if located remotely from the monitor control unit 110. The cameras 126 may employ a small solar cell to recharge the battery when light is available. Alternatively, the cameras 126 may be powered by the controller's 112 power supply if the cameras 126 is co-located with the controller.

In some implementations, the cameras 126 communicates directly with the application server 130 over the Internet. In these implementations, image data captured by the cameras 126 does not pass through the monitor control unit 110 and the cameras 126 receives commands related to operation from the application server 130.

The electronic lock 128 may be an electronic computing device that is placed on the exterior of the property 101 and configured to provide access to a user with the presentation of a distributed access credential through the user device 140. For example, once the prospective receives a distributed access credential and enters the distributed access credential into an application, the access credential may be considered to be in an "active" state, indicating that the user has used the distributed access credential to view property information related to the property 101. In response, the information associated with the activated access credential (e.g., access conditions specified by the property administrator 104, user information associated with the distributed access credential, etc.) may then be transmitted to the monitor control unit 110 of the property 101. The transmitted information may include a stored access credential that is then used by the electronic lock 128 to establish communications with the user device 140 when the user 102 (previously, the user) first accesses the property 101 to initiate the rental period.

The application server 130 is an electronic device configured to provide monitoring services by exchanging electronic communications with the monitor control unit 110 and the user device 140 over the network 105. For example, the application server 130 may be configured to monitor events (e.g., start or end of a rental period, user activity data collected during a rental period) generated by the monitor control unit 110 and/or other devices connected over the network 105. In this example, the application server 130 may exchange electronic communications with the network module included in the monitor control unit 110 to receive information regarding events detected by the monitor control unit 110. The application server 130 also may receive information regarding events from the user device 150 of a property administrator 104 (e.g., rental property information, access credentials distributed to users, and/or access conditions associated with access credentials for the property).

The applications server 130 may also exchange data communications with the user device 140 associated with the user 102. For instance, after the user 102 activates the distributed access credential on an application running on the user device 140 (depicted more particularly in FIG. 6A), the applicant may transmit the activated access credential and user-specific information (e.g., username, last name, password, etc.) to the application server 130. The application server 130 may store the received access credential and determine a set of access conditions 132 that are associated with an access credential for the property 101. As described herein, one or more access credentials are created for the property 101 once the property 101 becomes available for rent (e.g., an online listing on a property rental website).

Prior to generation of the access credential, the property administrator 104 may specify access conditions 132 to specify attributes and/or limitations associated with the property rental. For example, as described more particularly with respect to FIG. 5A, the property administrator 104 may use a rental property management portal to specify the access conditions 132 on the user device 150. In response, the specified access conditions 132 are then transmitted and stored on the application server 130.

The access conditions 132 refer to specifications and/or limitations associated with a property rental. In the examples depicted in FIG. 1, the access conditions 132 may include attributes associated with the access credential (e.g., time period of activation), indications as to whether the property rental is for the entire property or a particular region within the property (e.g., limiting access to particular rooms), ancillary services that are included with the property rental (e.g., time-limited access to the appliances 124), among other types of rental specifications.

Once the communication pathway between the user device 140 and the application server 130 has been established (e.g., by activation of the distributed access credential on an application running on the user device 140), the user 102 may transmit instructions to perform actions related to the property rental. Examples of actions may include signals to operate the appliances 124, locking and unlocking the electronic lock 128, among others. In such examples, the application running on the user device 140 may present a user interface with user-selectable options to perform particular actions. The instructions to perform the may then be transmitted to either the application server 130 (e.g., when a user 102 physically accesses the property 101 for the first time or in cases where the user device 140 does not directly communicate with the monitor control unit 110), or directly to the monitor control unit 110 or other devices connected over the network 105 (e.g., after the user device 140 has already established communications with the monitor control unit 110).

In some implementations, the application server 130 stores sensor and image data received from the monitor control unit 110 and performs analysis of the received sensor and image data. Based on the analysis, the application server 130 may communicate with and control aspects of the monitor control unit 110 or the user device 140.

The user device 140 may be an electronic device associated with a user or the user 102 and the user device 150 may be an electronic device associated with the property administrator 104. The user devices 140, 150 that exchange network communications over the network 105. For example, the user devices 140, 150 may be one or more of a smartphone, tablet, personal computer (PC), network-enabled media player, home entertainment system, cloud storage device, and other types of network devices. The user devices 140, 150 may access an application made available by the application server 130 on the network 105, such as an application (depicted in FIGS. 5A-5B and 6A-6B). The data generated by the user devices 140, 150 may include over the network 105, which may be monitored by the monitor control unit 110.

The user devices 140, 150 can include a native application. The native application refers to a software/firmware program running on the corresponding mobile device that enables the user interface and features described throughout.

The user devices 140, 150 may load or install the native surveillance application based on data received over a network (e.g., the network 105) or data received from local media. The native application is capable of operating on various mobile devices platforms. The native application also enables the user devices 140, 150 to receive and process rental property data from the system 100.

In some implementations, the user devices 140, 150 communicate with and receive system data from the monitor control unit 110 or the application server 130 using a communication link. For instance, the user devices 140, 150 may communicate with the monitor control unit 110 using various local wireless protocols such as Wi-Fi, Bluetooth, Zwave, Zigbee, HomePlug (Ethernet over powerline), or wired protocols such as Ethernet and USB, to connect the user devices 140, 150 to local security and automation equipment. The user devices 140, 150 may connect locally to the system 100 and sensors 122 and other devices. The local connection may improve the speed of status and control communications because communicating through the network 105 with a remote server (e.g., the application server 130) may be significantly slower.

Although the user devices 140, 150 are shown as communicating with the application server 130, the user devices 140, 150 may also communicate directly with the sensors 122 and other devices controlled by the monitor control unit 110 when the user devices 140, 150 are near the property 101. For example, the user devices 140, 150 may exchange communications with the devices of the system 100 over the network 105.

In some implementations, the user devices 140, 150 receive system data captured by the monitor control unit 110 through the network 105. The user devices 140, 150 may receive the data from the monitor control unit 110 through the network 105 or the application server 130 may relay data received from the monitor control unit 110 to the user devices 140, 150 through the network 105. In this regard, the application server 130 may facilitate communication between the user devices 140, 150 and the system 100.

In some implementations, the system 100 intelligently leverages the monitor control unit 110 to aid in security monitoring, property automation, and property management. For example, the monitor control unit 110 may aid in investigating alarm events detected at the property 101 by the monitor control unit 110. In this example, the monitor control unit 110 may detect an alarm event (e.g., a fire alarm, an entry into the property 101 when the system is armed "Stay," etc.) and, based on the detected alarm event, control the monitor control unit 110 to attempt to identify persons in the property 101 at the time of the alarm event. Specifically, the monitor control unit 110 may send a control command that causes the sensors 122 and the cameras 126 to perform a coordinated and automated search for persons in the property 101. Based on the control command received, each of the cameras 126 captures images of the property 101.

Figure 2:
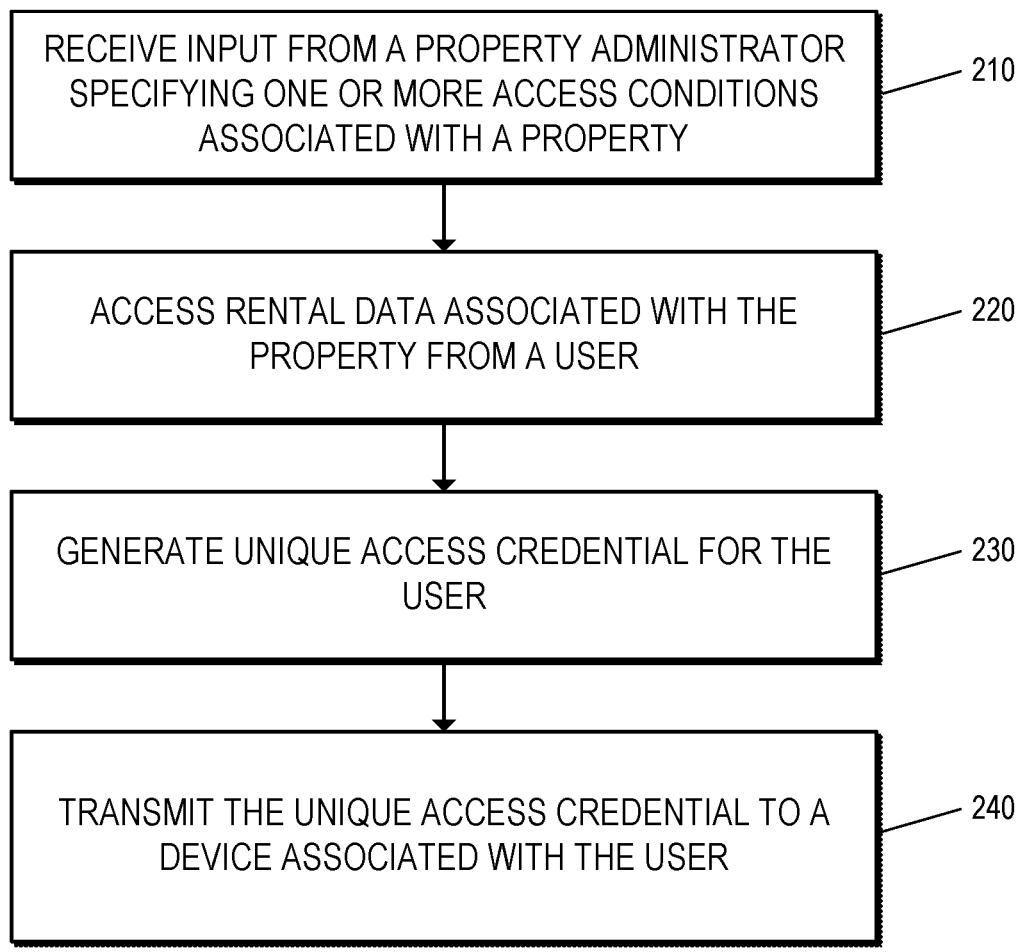
FIG. 2-3 are flowcharts that illustrate examples of processes relating to temporary rental property access.

FIG. 2 illustrates an example of a process 200 for generating a unique access credential for a user that requests to rent a property. Briefly, the process 200 may include receiving input from a property administrator 104 specifying one or more access conditions associated with a property (210), accessing rental data associated with the property from a user (220), generating a unique access credential for the user (230), and transmitting the unique access credential to a device associated with the user (240).

In more detail, the process 200 may include receiving input from a property administrator 104 specifying one or more access conditions associated with a property (210). For instance, the user device 150 may receive input from the property administrator 104 that specify the access conditions 132 associated with the property 101 on an application running on the user device 150. In some instances, the application may be an application that is configured to exchange communications with the monitor control unit 110 or the application server 130. As described herein with respect to FIG. 1, the input from the property administrator 104 may include selections of user-selectable interface objects that are associated with rental property specifications (e.g., rental time period, ancillary services available during the rental period, scope of rental within the property, etc.).

The process 200 may include accessing rental data associated with the property from a user (220). For instance, the application server 130 may receive data from the user device 140 associated with a user that indicates that the user is renting the property 101. In some examples, the rental data may include a rental start date and time and a rental end date and time.

The process 200 may include generating a unique access credential for the user (230). For instance, the application server 130 may generate a user-specific access credential for the user associated with the user device 140. As described herein with respect to FIG. 1, the generated access credential may be used as a user credential used to authenticate the user as the person that made the reservation. The generated access credential may have attributes that control its use with components of the monitor control unit. For example, the generated access credential may be associated with the access conditions 132 specified by the property administrator 104.

The process 200 may include transmitting the unique access credential to a device associated with the user (240). For instance, after generating the access credential for the user, the application server 130 may then distribute the generated access credential to the user device 140. As described herein, the distribution of the generated access credential may include a transmission of an email to an email address corresponding to the user, a SMS message using the mobile capabilities of the user device 140, or other type of electronic formats.

Figure 3:
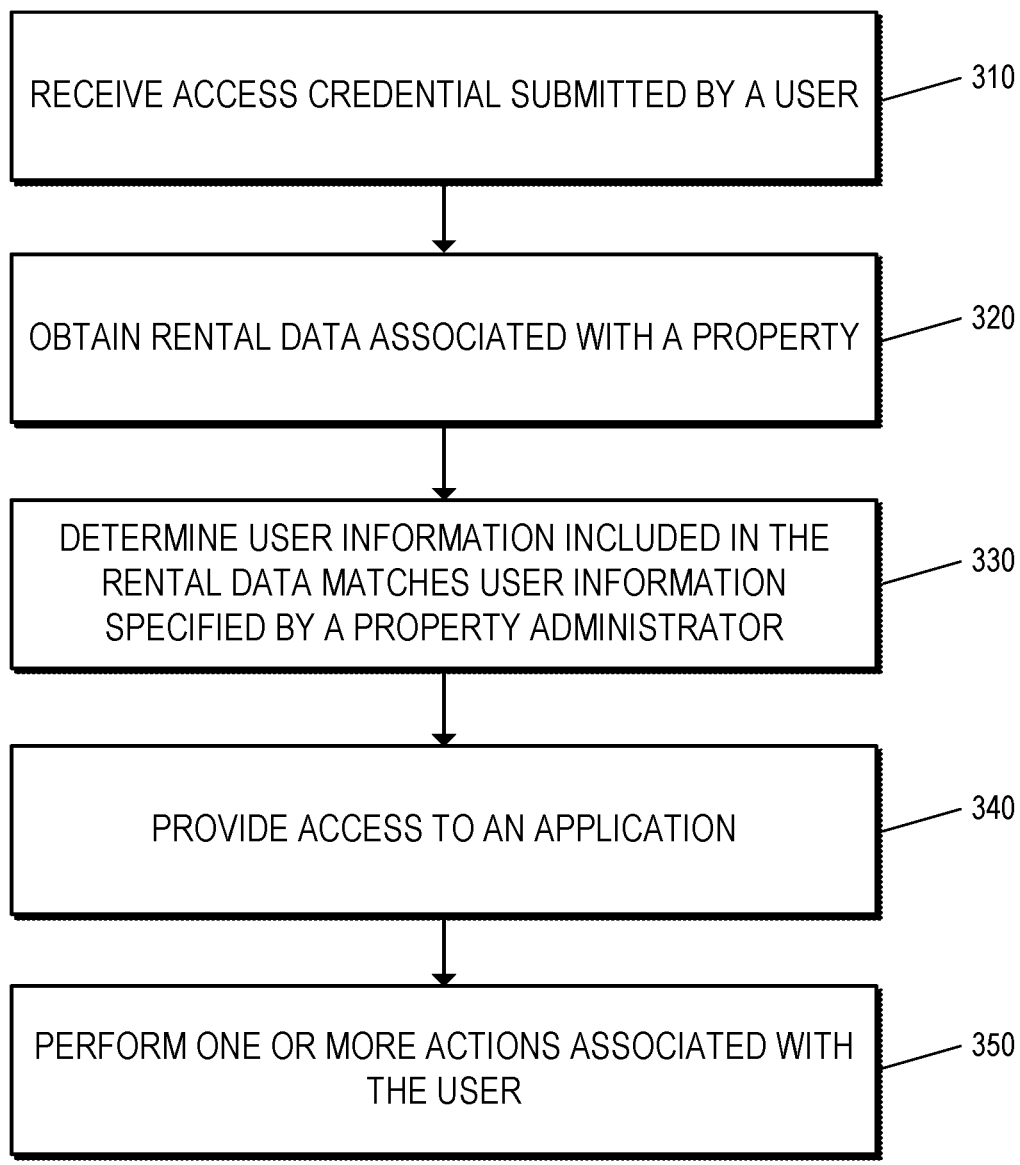

FIG. 3 illustrates an example of a process 300 for enabling a user to access information associated with a rental property. Briefly, the process 300 may include receiving an access credential submitted by a user (310), obtaining rental data associated with a property (320), determining that user information included in the rental data matches user information specified by a property administrator (330), providing access to an application (340), and performing one or more action associated with the user (350).

In more detail, the process 300 may include receiving an access credential submitted by a prospective (310). For instance, once an access credential is distributed to the user device 140 associated with a user, the user device 140 may also receive a link to install an application associated with the application server 130 on the user device 140. The user may be directed to install the application on the user device 140 through a webpage or through a deep-link that redirects the user to a page in an application store. After installing the application on the user device 140, the user may submit the distributed access credential on the application, which is then transmitted to the application server 130.

The process 300 may include receiving user rental data associated with a property (320). For instance, after receiving the submitted access credential from the application running on the user device 140, the application server 130 may identify the rental property (e.g., property 101) associated with the submitted access credential and obtain rental data stored a database that includes rental data for all properties of the property administrator 104 that are available for rent. For example, the rental data may include information associated with the property 101, user information for any users, or information submitted by the property administrator 104 on a rental property listing.

The process 300 may include determining that the user information included in the rental data matches user information specified by a property administrator (330). For instance, in response to obtaining rental data associated with the property 101, the application server 130 may identify user information associated with the submitted access credential (e.g., last name of the user) that is included in the obtained rental data. The application server 130 may also identify user information that is specified by the property administrator 104, and compare the user information associated with the submitted access credential and the user information submitted by the property administrator 104. For example, the comparison may be used to detect fraudulent attempts to rent the property 101 by unauthorized entities (e.g., any individual that the property administrator 104 does not designate as the user to receive the distributed access credential). If the user information associated with the submitted access credential matches the user information submitted by the property administrator, then the application server 130 determines a successful attempt to access property information related to the property 101. For example, the application server 130 may have a reservation with an access credential of "1234" associated with the user "John Doe" and receive an access credential of "1234" and last name of "Doe" and determine that the received last name of "Doe" matches the last name of "Doe" associated with the reservation associated with the access credential of "1234." In another example, the application server 130 may have a reservation with an access credential of "1234" associated with the user "John Doe" and receive an access credential of "1234" and last name of "Smith" and determine that the received last name of "Smith" does not match the last name of "Doe" associated with the reservation associated with the access credential of "1234."

The process 300 may include providing access to an application (340). For instance, in response to determining that the user information associated with the submitted access credential matches the user information submitted by the property administrator 104, the application server 130 may provide access to an application through which the user submitted the access credential. More particular descriptions related to the application are described with respect to FIGS. 6A-6B.

The process 300 may include performing one or more action associated with the user (350). For instance, as described herein with respect to FIG. 1, once the user has obtained access to the application running on the user device 140, the user may transmit instructions to perform actions related to the property 101 through the application. For example, the user may transmit an instruction to operate one of the appliances 124 within the property, which is then transmitted either to the application server 130, or directly to the monitor control unit 110 or the particular appliance. In this example, the established communication pathway between the user device 140, the application server 130, and the monitor control unit 110 may be over the network 105 once the user obtains access to the application used to perform actions related to property rental at or near the property 101.

Figure 4:
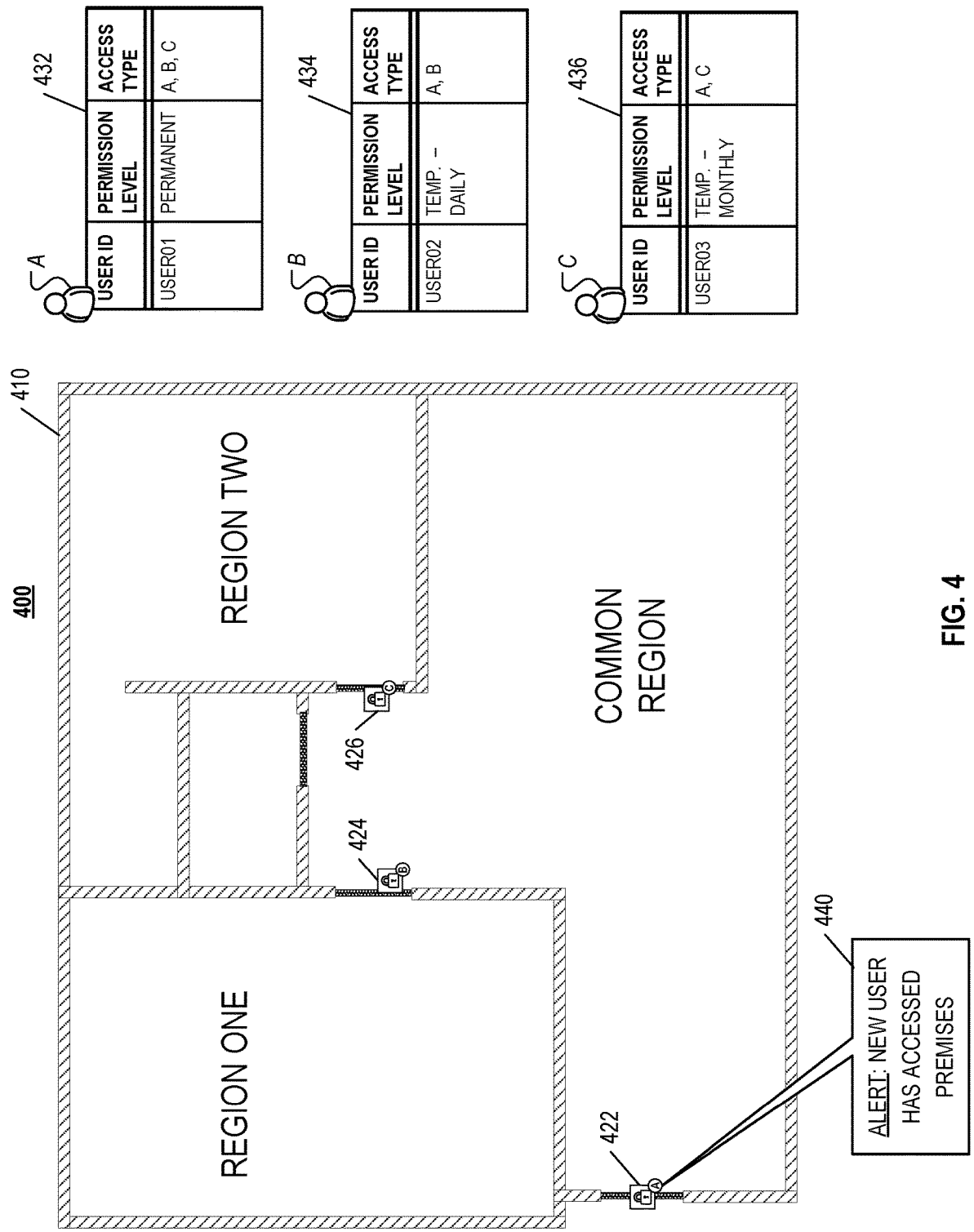
FIG. 4 is a schematic diagram that illustrates an example of a rental property with multiple access regions.

FIG. 4 illustrates an example of a rental property 410 that includes multiple access regions. For instance, the rental property 410 includes regions one and two, which can be separately rented to different user users, and a common region that is accessible to all user users. For example, the regions one and two can represent different bedrooms within a rental property that is rented to different users during an overlapping rental period. In other examples, the region one and two can represent different floors, sub-units, or other types of divisions within a single property or dwelling.

Access to the premises and different regions within the property 410 can be controlled using electronic locks 422, 424, and 426. In some instances, the electronic locks 422, 424, and 426 correspond to the electronic lock 128 as described herein with respect to FIG. 1. In the example, the electronic lock 422 provides access to the common region of the property 410, the electronic lock 424 provides access to region one, and the electronic lock 426 provides access to region two. As described herein, an access credential distributed to a user can be used to configure a device associated with the user such that the user device can unlock the applicable electronic devices using instructions transmitted through the device. For example, the user may use an application that is enabled by the distributed access credential to transmit an instruction to a system 100 (e.g., the system 100) associated with property 410.

In the example depicted in FIG. 4, the system 100 identifies access credential information for three users that have access to the property 410, which are shown in tables 432, 434, and 436. The tables each identify user-specific information associated with respective access credentials (e.g., user IDs) and specifies a permission level that dictates privileges to access various regions of the property 410. In this example, user A represents a property administrator 104 that has privileges to access all regions of the property 410. In contrast, users B and C represent users that rent different regions (e.g., regions one and two) of the property 410. In some instances, the users B and C may be co-users that both rent the different regions of the property 410 during an overlapping period of time. In such instances, the regions one and two can represent different rooms within the property 410 that are made available for rent by the property administrator 104.

As depicted, the tables 432, 434, and 436 identify respective access privileges that are specified by the corresponding access credential for each user. For example, the access credential distributed to user B indicates that he/she has access to region one but not to region two, and whereas the access credential distributed to user C indicates that he/she has access to region two but not to region one.

In addition to specifying the access privileges for each user, the tables 432, 434, and 436 specify the type of access credential distributed to each user. For example, user A has a permanent access credential that provides access to the property 410, whereas user B has a temporary access credential that provides access on a daily basis, and user C has a temporary access credential that provides access to the property 410 on a monthly basis. In this regard, access credential distribution can be used to specify different types of tenancies of the property 410 (e.g., temporary, at-will, lease, etc.), while also enabling the property administrator 104 to specify the level of access to provide with each type of tenancy (e.g., access to the entire premises for daily periods, or access to a particular region for monthly periods).

In some implementations, the property administrator 104 may receive various alerts or notifications based on the activity of users at or near the property 410. For example, the property administrator 104 may initially receive an alert 440 when a user initially unlocks the lock 422 and to obtain possession over the property 410. In other examples, the property administrator 104 may also receive alerts when a user attempts to perform actions that are prohibited by the access conditions described herein. For instance, if the access credential distributed to a particular user indicates that they cannot access a specific region within the property, then the system 100 (e.g., the system 100) of the property 410 may perform one or more monitoring operations to detect if and when the particular user attempts to access the prohibited region. In response to detecting an unauthorized access attempt, the system 100 may then transmit an alert to a device associated with the property administrator 104 indicating information such as, for example, the number of unauthorized actions attempted, timestamps associated with the actions attempted, among other types of information. In some implementations, the monitoring operations can additionally or alternatively include obtaining data collected by the devices associated with the system 100 (e.g., obtaining sensor data collected by the sensors 122, or collecting video data collected by the cameras 126).

Figure 5A:
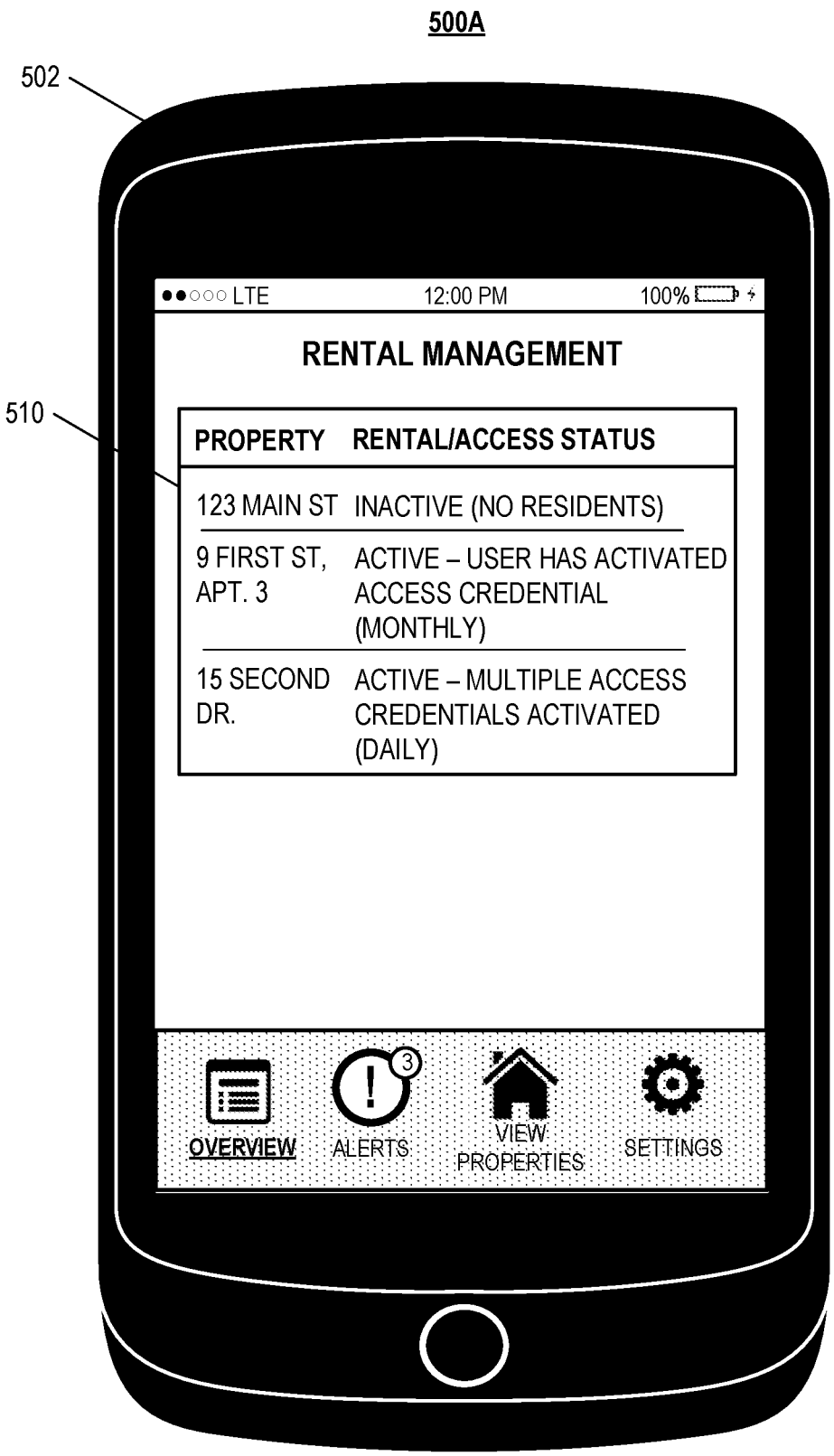
FIGS. 5A-5B are schematic diagrams that illustrate examples of user interfaces for an application that is used by a property administrator.
Figure 5B:
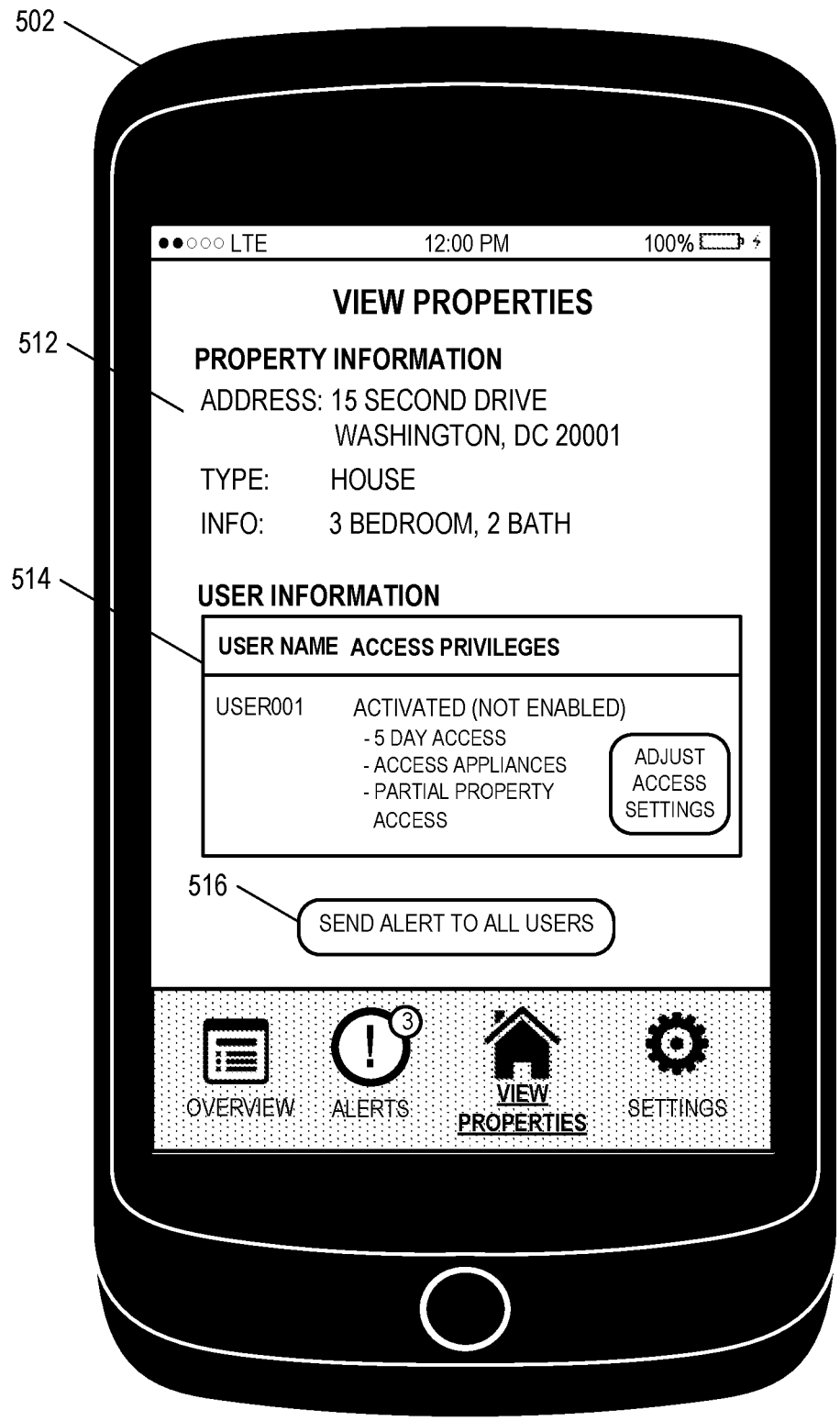

FIGS. 5A-5B illustrate examples of user interfaces 500A and 500B of an application that includes a rental property management portal used by a property administrator 104. For instance, interface 500A enables a property administrator 104 to view the statuses associated with a list of rental properties, and interface 500B enables the property administrator 104 to view detailed rental information associated with a single property. Although FIGS. 5A-5B illustrate the interfaces 500A and 500B being displayed on an application running on a device 502, in other implementations, the interfaces 500A and 500B can also be displayed in other electronic formats such as a desktop application, a webpage, or other types of content distribution interfaces. In some instances, the device 502 corresponds to the user device 150 described herein with respect to FIG. 1.

Referring initially to FIG. 5A, the interface 500A includes a reservation management page that displays an overview of all available rental properties that are either managed or owned by the property administrator 104. For instance, table 510 identifies each rental property and indicates a rental/access status associated with each rental property. The rental/access status indicates whether a user s activated a distributed access credential for a corresponding rental property and the access period specified by the distributed access credential. For example, the table 510 specifies an "INACTIVE (NO RESIDENTS)" status for the "123 MAIN ST" property, indicating that the system has not yet distributed an access credential for the property to a user. In another example, the table 510 specifies an "ACTIVE-USER HAS ACTIVATED TOKEN (MONTHLY)" status for the "9 FIRST ST, APT. 3" property, indicating that the system has distributed a single access credential for the rental property on a monthly basis to a user, who has activated the distributed access credential. In yet another example, the table 510 specifies an "ACTIVE-MULTIPLE ACCESS CREDENTIALS ACTIVATED (DAILY)" status for the "15 SECOND DR." property, indicating that the system has distributed multiple access credentials for the rental property on a daily basis to multiple co-users that each rent a particular region of the rental property.

Referring now to FIG. 5B, the interface 500B includes a property detail page that allows a property administrator to view and adjust property-specific information associated with a rental property. For instance, the property detail page includes property information 512, user information 514, and an alert button 516. In the example depicted, the property information 512 specifies a property address (e.g., "15 Second Drive, Washington, DC 20001"), a property type (e.g., a house), and/or other information (e.g., 3-bedroom, 2-bath).

The user information 514 includes a username associated with a user and specifies access credential information associated with the user. In the example depicted in FIG. 5B, the access credential information for the user "USER001" indicates that the access credential is "ACTIVE (NOT ENABLED)." In this example, this indicates that the user has entered a distributed access credential into an application (e.g., into the interface 600A depicted in FIG. 6A), but has not yet used the access credential to physically access the property thereby initiating the rental period.

The user information 514 further specifies a set of specifications and services that are associated with the property rental by the user 102. In the examples depicted in FIG. 5B, such specifications may include the time period for rental (e.g., 5-day access), ancillary services that are included within the rental (e.g., access to appliances), and/or the scope of access within the property that is covered under a rental agreement (e.g., partial property access).

The user information 514 may provide the property administrator 104 with an option to adjust preconfigured access settings during various time points of a rental agreement (e.g., after a rental agreement has been formed but before the start of the rental period, or during the rental period, etc.). For instance, a property administrator 104 may choose an option to adjust access settings during a rental period by selecting the "ADJUST ACCESS SETTINGS" button, which then redirects the property administrator 104 to an access configuration page that allows the property administrator 104 to specify specifications associated with the property rental. In response to receiving an updated selection of rental specifications, the system 100 may then provide an additional notification to the user 102, and/or dynamically reconfigure the system 100 associated with the property 101 to effectuate the updated rental specifications. In one example, a property administrator 104 may wish to restrict access to a particular appliance within the property 101 after a rental agreement that includes access to the particular appliance has been formed. In this example, once the property administrator 104 updates the access settings, the application server 130 may transmit an instruction to the monitor control unit 110 to adjust a set of access configurations associated with the distributed access credential. Once the user 102 subsequently uses the distributed access credential through the user device 140 to transmit an instruction to operate the particular appliance, the monitor control unit may use the set of adjusted access configurations to restrict access to the particular appliance.

The alert button 516 provides the property administrator 104 with the option to transmit notifications, alerts, and/or other supplemental information to all users associated with the particular rental property displayed within the property detail page. For example, the property administrator 104 may use the alert button 516 to transmit property-related information (e.g., maintenance updates, payment reminders, updates on user service requests, etc.).

Figure 6A:
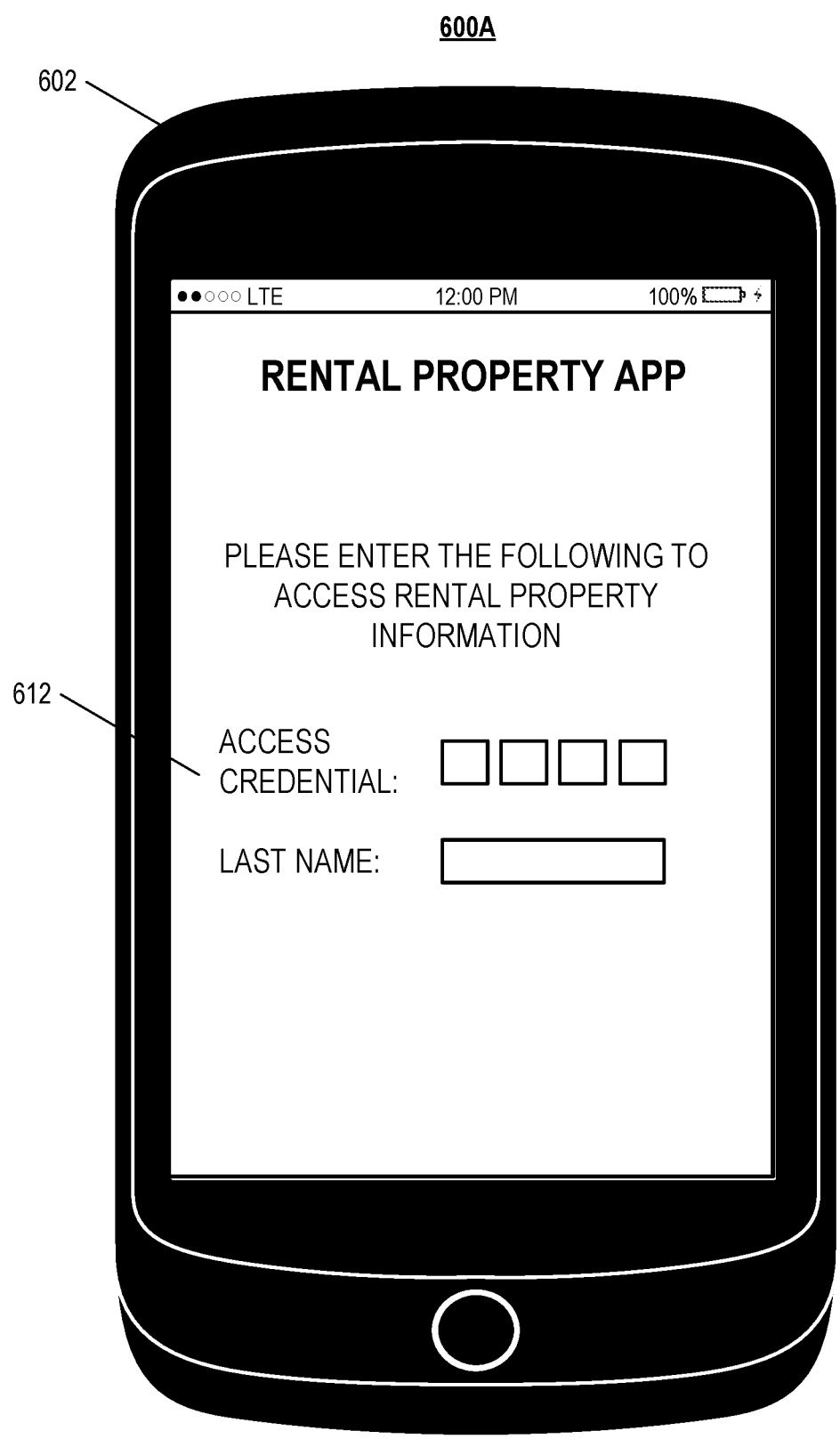
FIGS. 6A-6B are schematic diagrams that illustrate examples of user interfaces for an application that is used by a user.
Figure 6B:
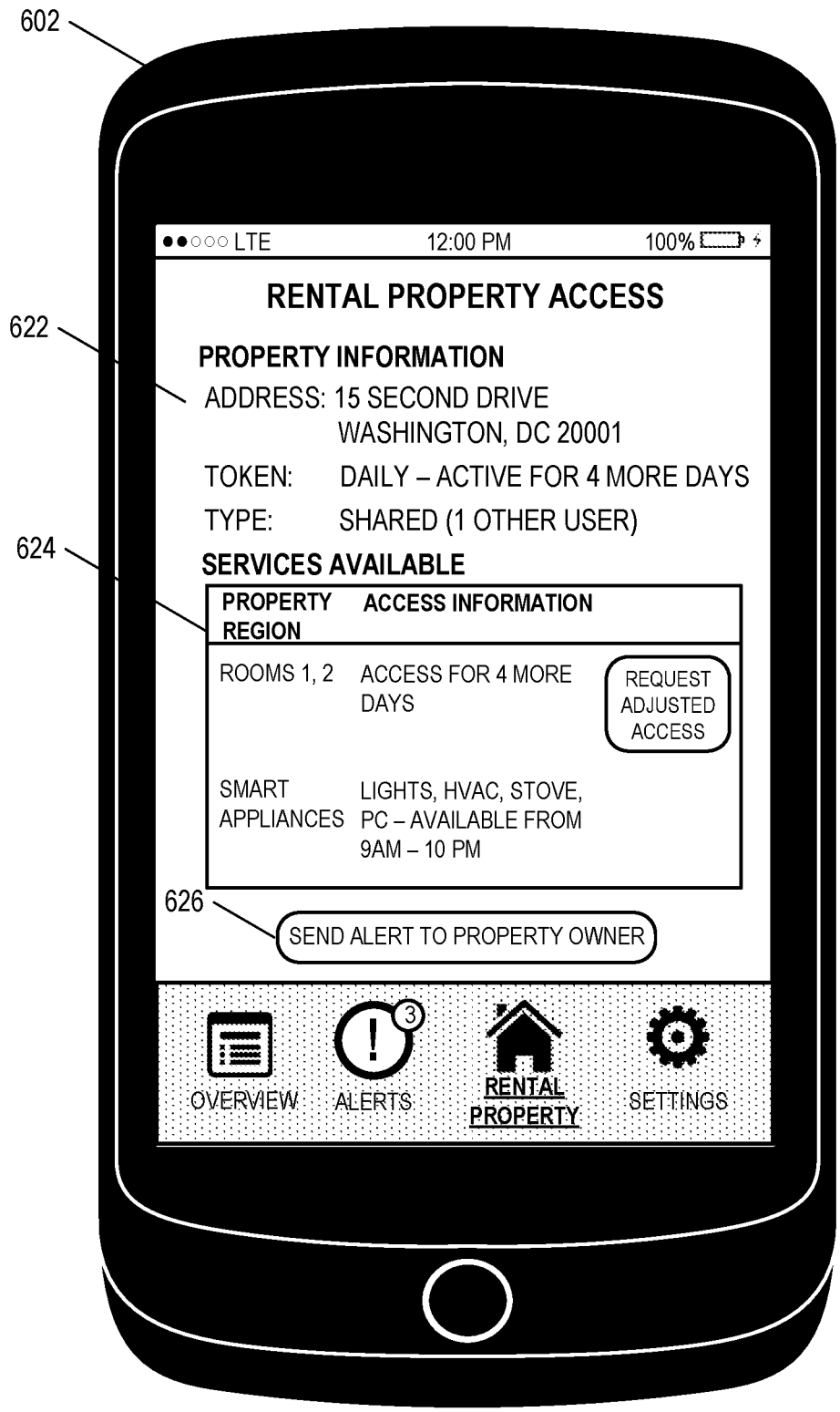

FIGS. 6A-6B illustrate examples of user interfaces 600A and 600B, respectively, for an application that is used by users such as temporary guests of a rental property. Specifically, interface 600A enables a user to submit an access credential for authentication purposes to obtain access to the application. The interface 600B enables the user to view and access rental property information after gaining access to the application using the submitted access credential. Although FIGS. 6A-6B illustrate the interfaces 600A and 600B being displayed on an application, in other implementations, the interfaces 600A and 600B can also be displayed in other electronic formats such as through a webpage portal.

Referring initially to FIG. 6A, the interface 600A represents a login page of the application that runs on a user device 602. The user can access the interface 600A on the user device 602 to submit an access credential 612 for authentication into the application. The application is capable of exchanging communications with an application server associated with a monitoring system of the rental property, as depicted in FIG. 1. In this regard, access to the application through the interface 600A enables the user to, for example, control electronic devices of the monitoring system using actions presented through application. For example, the user can use the application to gain physical access to the property (e.g., by unlocking an electronic lock), control electronic devices located within the property (e.g., by submitting remote instructions through the application), among others.

In some implementations, the actions may include all actions that users are permitted to trigger in the property. In other implementations, such actions can include viewing and accepting the terms of a rental agreement, accessing additional property information, exchanging communications with the property administrator 104, among other types of actions.

As described herein with respect to FIG. 1, the user 102 may initially receive a distributed access credential in response to submitting an inquiry related to a rental property (e.g., a reservation request submitted for an electronic rental listing for the rental property). In some implementations, the distributed access credential is associated with external account information of the user (e.g., username, last name, etc.) such as a user account for a rental property listing website or a rental property listing application.

Referring now to the example depicted in FIG. 6A, the user submits an access credential 612 that includes PIN number and a last name. Once the user has submitted the access credential 612 on the login page, the distributed access credential becomes "active." As discussed previously with respect to FIG. 1, in some implementations, the activated access credential refers to an indication that a user has used a distributed access credential to access an application. In this regard, an activated access credential provides the property administrator 104 with an indication that the user may have an interest in renting the rental property. In such instances, multiple access credentials may be distributed for a single property (e.g., to multiple users), and once a particular user agrees to enter into a rental agreement, the corresponding access credential becomes "enabled," indicating that the rental property is no longer available for rent to other users. In response to a rental agreement being formed between a user 102 and a property administrator 104, the system 100 may automatically deactivate all other access credentials that have been previously distributed to other users.

Alternatively, in other implementations, an access credential operates as a single-use token that provides only a single user with access to property information on an application. In such implementations, only the user 102 that has already formed a rental agreement with a property administrator 104 is provided a distributed access credential. The distributed access credential can then be used by the user 102 to perform actions that are related to the property rental as described throughout. For example, such actions can include transmitting an instruction to the system 100 to unlock the electronic lock 128 in order to physically access the property 101, transmitting instructions to operate the appliances 124 within the property 101, and/or exchanging communications with the property administrator 104.

In addition, in some instances, in response to an activation of the access credential by the user 102, the system 100 associated with the property 101 may receive and store user-specific information associated with the distributed access credential (e.g., username, password, last name, etc.) prior to the start of the rental period. Once the user 102 uses the user device 140 to perform actions related to the property 101 (e.g., physically access the property 101, transmit instructions to the monitor control unit 110, etc.), the system 100 may then perform a user verification operation to ensure that the presentation of the access credential is by an authorized user and/or user device. In these instances, the user-specific information may include information that is uniquely available to the user 102 (e.g., answers to security questions), hardware-related information of the user device 140, among other types of information.

In some implementations, the system performs different types of verification operations in association with the access credential submitted by the user on the application. For example, in some instances, the system performs a verification operation prior to distributing an access credential to the user and/or allowing the user to access a login page of the application where an access credential can be submitted such as the interface 600A. In such instances, the system initially verifies that the user that is provided the distributed access credential and/or with access to the login page of the application is actually the actual user that that submitted the rental reservation and/or formed the rental agreement. For example, before distributing the access credential, the user may be requested to provide user-specific information that is used to identify the identity of the user (e.g., user-specific information associated with an account for a property listing website). In such instances, the user is distributed the access credential and/or provided with access to the login page of the application where the distributed credential can be submitted only after his/her identity has been verified.

Alternatively, or in addition, the system performs a verification operation after the user has submitted the access credential on, for example, a login page of the application such as the interface 600A. In such instances, the system can verify either the submitted access credential (e.g., determining whether a submitted PIN code is correct), or verify some other type of externally associated data related the access credential such as uniquely identifiable information for the user submitting the access credential, and/or device data for the user device used to submit the access credential. For example, the user may be requested to provide account information associated with an existing account (e.g., an account associated with a rental listing website), which is then used as a second factor authentication in addition to the submitted access credential. In other examples, the user may be requested to provide identifying information for the rental property (e.g., a property identifier) in order to verify that he/she is attempting to access the correct rental property through the application. In some other examples, sensor data such as location data of the user device can be used to verify the submitted access credential. In such examples, the system determines that the submitted access credential is verified only if the user is within a threshold proximity to the location of the rental property.

Although the verification operations described above are in relation to the activation of the access credential (e.g., the process by which a user submits the access credential to gain access to the application), in some other implementations, the system can perform verification operations in relation to access credential enablement. The system may perform such verification operations after the access credential has been activated but before the access credential has been enabled to prevent unauthorized users from gaining access to the property. For example, when a user attempts to physically access the rental property, location data of the user device used by the user can be used to determine if he/she is within a threshold proximity (e.g., within 50 feet) of the location of the rental property. In this example, even though the user has previously activated the access credential, he/she can only enable the access credential to gain access to the property if the system verifies that his/her associated device is located nearby the property.

Referring now to FIG. 6B, the interface 600B provides a rental property access page that provides a user with rental property access information through an application. For instance, the rental property access page may include property information 622, available service information 624, and an alert button 626. In the example depicted, the property information 622 specifies a property address (e.g., "15 Second Drive, Washington, DC 20001"), access credential status and information (e.g., provided on a daily basis and active for four more days), and/or other rental information (e.g., shared rental with one other user).

The available service information 624 specifies various types of services that are associated with the rental property. For instance, the available service information 624 may specify regions of the property that are physically accessible by the user 102 under the rental agreement (e.g., rooms 1, 2) and associated access information such as the remaining time period that the enabled access credential provides physical access to the user 102 (e.g., four days remaining within a rental period).

The available service information 624 also specifies a list of appliances and other electronic devices that are available for use by the user 102 during the property rental. In the example depicted, the available service information 624 specifies a list of smart appliances that can be operated by exchanging communications between the system 100 within the property 101 and the user device 602. For example, the user 102 may transmit instructions to the monitor control unit 110 or the application server 130, which then relays the instructions to the appliances 124. In this example, the access credential distributed to the user 102 and the corresponding specifications provided to the system 100 enables the user 102 to access the appliances 124 that are indicated in the access conditions described herein with respect to FIGS. 5A and 5B. The access conditions provide limitations on access privileges granted by a distributed access credential (e.g., availability from 9 AM to 10 PM).

The alert button 626 provides the user 102 to transmit messages, alerts, notifications, or other types of communication to the property administrator 104 in a manner similar to that of the alert button 516 described herein with respect to FIG. 5B, but from the perspective of the user 102.

Figure 7:
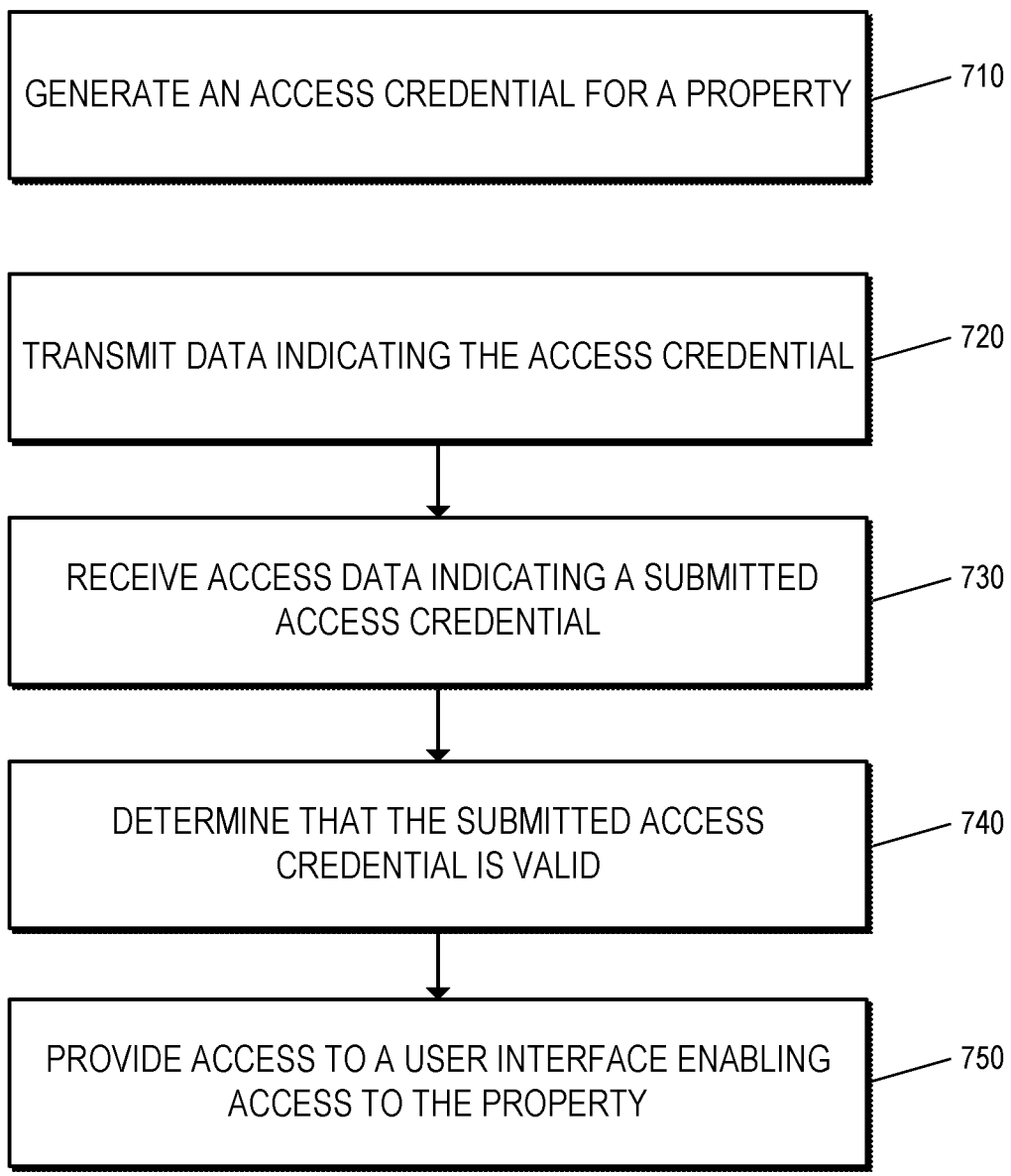
FIG. 7 is a flowchart that illustrates an example of a process for providing temporary access to a property.

FIG. 7 is a flowchart that illustrates an example of a process 700 for providing temporary access to a property. Briefly, the process 700 can include the operations of generating an access credential for a property (710), transmitting data indicating the access credential (720), receiving access data indicating a submitted access credential (730), determining that the submitted access credential is valid (740), and providing access to user interface enabling access to the property (750).

The operations of the process 700 can generally be executed by one or more components of the system 100 as depicted in FIG. 1. For example, the operations can be performed by the application server 130, the monitor control unit 110, or a combination thereof. The descriptions below are provided in reference to the application server 130 for brevity.

In more detail, the process 700 can include the operation of generating an access credential for a property (710). For instance, the application server 130 generates an access credential that specifies a time period that the access credential provides access to the property 101. As described herein, the access credential can be generated at various time points in relation to the rental process. In some implementations, the access credential is generated once the property administrator 104 creates an electronic listing for the property 101 on a rental listing website but before a user actually submits a reservation request for the rental listing. Alternatively, in other implementations, the access credential is generated once a user submits a reservation request to the rental listing.

As described above, the access credential specifies a time period that the access credential can be used to provide the user 102 with access to the property 101. In some instances, the time period corresponds to a rental period during which the user 102 rents the property 101 under a rental agreement with the property administrator 104. In such instances, the access credential is revoked after the rental period (e.g., the user 102 is unable to use the access credential to access the property 101). In other instances, the time period corresponds to a time period specified by the property administrator 104 irrespective of the rental period.

As described above, the generated access credential can also have different configurations and/or functions based on their specific application. In some implementations, a generated access credential can be used by multiple users to access rental property information through an application. For example, before a rental agreement has been formed between the property administrator and a user, a single access credential can be used by multiple users to access rental property information over the application. Alternatively, in other implementations, multiple user-specific access credentials can be generated for each user that submits a rental reservation for the same time period before a rental agreement has been formed for the time period. In addition, as discussed above, in some implementations, access credentials may be used multiple times by one or more users. Alternatively, in other implementations, access credentials can be used as single-use tokens that are only capable of used once by a user.

The format and/or content of the generated access credential can vary across different implementations. In some implementations, the access credential is an alphanumeric code such as a PIN number. In such implementations, the access credential can be distributed to the user device 140 as, for instance, a text message that includes alphanumeric code. In other implementations, the access credential represents a combination of an access code and other association information such as personally identifiable information for the user 102. For example, as depicted in FIG. 6A, the access credential can include both an access code and a last name for the user 102. In some other implementations, the access credential represents a combination of an access code and property-specific information for the property 101 that allows the application to associate the access credential with the property 101. For example, the access credential can include an access code and an identifier for the property 101 that is associated with an electronic rental property listing.

In some implementations, the access credential specifies one or more access conditions that provide, for example, restrictions for accessing the property using the access credential. For example, as depicted in FIG. 4, the access conditions can specify regions of the property that are accessible by the user 102 using the access credential and other regions of the property that are inaccessible by the user 102. Other examples of access conditions include the type of access provided by the access credential (e.g., permanent, temporary).

In some implementations, the specified access conditions can be adjusted during the time period when an access credential is "enabled" (e.g., being used by the user 102 to access the property 101). For example, as depicted in FIG. 5B, the property administrator 104 may adjust access conditions specifying access for the user 102 during the rental period, and in response, the system modifies the access credential distributed to the user 102 to specify the modified access conditions. In such circumstances, the user 102 can either be distributed a second access credential, or the application configuration protocol can be changed and/or updated to implement the modified access conditions specified by the adjusted access credential.

The process 700 can include the operation of transmitting data indicating the access credential (720). For instance, the application server 130 can transmit data indicating the access credential to the user device 140 of the user 102 using various types of electronic mediums (e.g., e-mail, text message, etc.). As described above, the access credential can be distributed to the user device 140 at different time points of the rental process across different implementations. For example, in some implementations, the access credential is distributed to the user 102 after he/she has submitted a reservation request but prior to the formation of a rental agreement. In such implementations, the user 102 can "activate" the access credential to access an application to view rental property information but is unable to "enable" the access credential to obtain access to the property 101 as described above. In other implementations, the access credential is distributed only after the user 140 has formed a rental agreement with the property administrator 104 to rent the property 101 over a rental period. In such implementations, the user 102 can "activate" the access credential to view property information on the application, and then "enable" the access credential to gain access to the property 101 at the start of his/her rental period under the rental agreement.

The process 700 can include the operation of receiving access data indicating a submitted access credential (730). For instance, once the access credential has been distributed to the user 102, the application server 130 receives access data from the user device 140 indicating a submitted access credential. For example, as depicted in FIG. 6A, the submitted access credential can be provided through a login page of the application where the user 102 can submit the access credential that was previously distributed and/or other types of information.

In some implementations, the access data includes other types of data in addition to the submitted access credential. For example, in some implementations, the access data additionally includes location data indicating a present location of the user device 140 when the user provided the submitted access credential. In other examples, the access data can include user-specific information (e.g., external account information of the user for a rental property website) or property-specific information (e.g., a property identifier for the property 101). In such examples, the user-specific information and/or the property-specific information can be used to validate the received access data.

The process 700 can include the operation of determining that the submitted access credential is valid (740). For instance, the application server 130 may determine that the submitted access credential is valid based on the access data received at step 730. In some implementations, the application server 130 determines that the submitted access credential is valid based on determining that the submitted access credential matches the access credential that was distributed to the user device 140 at step 720. In other implementations where the received access data includes other information, the application server 130 additionally, or alternatively, determines that the submitted access credential based on verifying the other information. For example, application server 130 may verify location data of the user device 140 based on determining that the present location of the user device 140 is within a threshold proximity of the location of the property 101. In other examples, the application server 130 may verify submitted user information included with the submitted access credential within the access data if the submitted user information matches a set of verified user information obtained from an external user account such as an existing user account with a rental listing website.

The process 700 can include the operation of providing access to user interface enabling access to the property (750). For instance, in response to determining that the submitted access credential is valid, the application server 130 provides the user 102 with access to a user interface (e.g., the user interface 600B) enabling access to the property for the time period specified by the access credential. Access to the user interface can be provided through a mobile application, as depicted in FIG. 6B, or through a webpage portal, as described above. Once the user 102 has been provided access to the user interface, the user can, for example, view property information for the rental property or perform actions in association with the rental property such as unlocking an electronic lock for the property to obtain physical access to the property. For example, a user can select a user interface element presented on the user interface that causes the user device 140 to transmit an indication to the application server 130 to relay an instruction to the unlock the electronic lock 128 and provide the user 102 with physical access to the property 101.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method performed by one or more computing devices, the method comprising:
   by the one or more computing devices included in a system:
   maintaining reservation data for a property;
   maintaining account data for a user and that was generated at least in part in response to receipt of a reservation request for the property or a request to list the property and without requiring the user to create a new account or user login for an application, wherein the account data is associated with the reservation data and comprises:
   an identifier for a device associated with the user, and
   an access credential for the user that allows control of at least a first electronic lock and a common electronic lock of a property;
   receiving, from the device, an access request indicating a submitted access credential and a submitted condition;
   determining, based on the access request and the reservation data, that the submitted access credential matches the access credential;
   based on determining that the submitted access credential matches the access credential, obtaining data indicating (i) a first condition that permits the device to control a first electronic lock using the application to provide access to a first region within the property and (ii) a second condition that restricts the device from controlling a second electronic lock to restrict access to a second region within the property;
   determining whether the submitted condition matches the first condition or the second condition; and
   in response to determining whether the submitted condition matches the first condition or the second condition, configuring the application that is executing on a second device by transmitting, to the second device, one or more instructions that cause the application to:
   a) provide access to the first region within the property in response the submitted condition matching the first condition, wherein providing access to the first region comprises sending, to the first electronic lock, an instruction that causes the first electronic lock to switch from a locked state to an unlocked state, and
   b) determine that the application cannot provide access to the second region within the property in response the submitted condition matching the second condition.

2. The method of claim 1, wherein the access credential comprises an alphanumeric code.

3. The method of claim 1, wherein the access credential is valid during a period during which the user has access to the first region of the property.

4. The method of claim 1, wherein the access credential specifies access to one or more electronic devices associated with a monitoring system of the property through the application.

5. The method of claim 1, wherein the application enables exchange of communications with one or more devices associated with a monitoring system of the property.

6. The method of claim 1, wherein:
   the first region comprises a first sub-unit in a multi-unit dwelling; and
   the second region comprises a second sub-unit in the multi-unit dwelling.

7. The method of claim 1, comprising:
   in response to receipt of the request to list the property and without requiring the user to create the new account or user login for the application, generating the account data that includes the access credential; and
   in response to receipt of a reservation request for the property, storing, as part of the account data, the identifier for the device associated with the user.

8. A system comprising:
   one or more computing devices; and
   one or more storage devices storing instructions that cause the one or more computing devices to perform operations comprising:
   maintaining reservation data for a property;
   maintaining account data for a user and that was generated at least in part in response to receipt of a reservation request for the property or a request to list the property and without requiring the user to create a new account or user login for an application, wherein the account data is associated with the reservation data and comprises:
   an identifier for a device associated with the user, and
   an access credential for the user that allows control of at least a first electronic lock and a common electronic lock of a property;
   receiving from the device, an access request indicating a submitted access credential and a submitted condition;
   determining, based on the access request and the reservation data, that the submitted access credential matches the access credential;
   based on determining that the submitted access credential matches the access credential, obtaining data indicating (i) a first condition that permits the device to control a first electronic lock using the application to provide access to a first region within the property and (ii) a second condition that restricts the device from controlling a second electronic lock to restrict access to a second region within the property;
   determining whether the submitted condition matches the first condition or the second condition; and in response to determining whether the submitted condition matches the first condition or the second condition, configuring the application that is executing on a second device by transmitting, to the second device, one or more instructions that cause the application to:
  a) provide access to the first region within the property in response the submitted condition matching the first condition, wherein providing access to the first region comprises sending, to the first electronic lock, an instruction that causes the first electronic lock to switch from a locked state to an unlocked state, and
  b) determine that the application cannot provide access to the second region within the property in response the submitted condition matching the second condition.

9. The system of claim 8, wherein the access credential comprises an alphanumeric code.

10. The system of claim 8, wherein the access credential is valid during a period during which the user has access to the first region of the property.

11. The system of claim 8, wherein the access credential specifies access to one or more electronic devices associated with a monitoring system of the property through the application.

12. The system of claim 8, wherein the application enables exchange of communications with one or more devices associated with a monitoring system of the property.

13. The system of claim 8, wherein:
the first region comprises a first sub-unit in a multi-unit dwelling; and
the second region comprises a second sub-unit in the multi-unit dwelling.

14. The system of claim 8, wherein the operations further comprise:
in response to receipt of the request to list the property and without requiring the user to create the new account or user login for the application, generating the account data that includes the access credential; and
in response to receipt of a reservation request for the property, storing, as part of the account data, the identifier for the device associated with the user.

15. At least one non-transitory computer-readable storage device storing instructions that cause one or more processors to perform operations comprising:
maintaining reservation data for a property;
maintaining account data for a user and that was generated at least in part in response to receipt of a reservation request for the property or a request to list the property and without requiring the user to create a new account or user login for an application, wherein the account data is associated with the reservation data and comprises:
an identifier for a device associated with the user, and
an access credential for the user that allows control of at least a first electronic lock and a common electronic lock of a property;
receiving from the device, an access request indicating a submitted access credential and a submitted condition;
determining, based on the access request and the reservation data, that the submitted access credential matches the access credential;
based on determining that the submitted access credential matches the access credential, obtaining data indicating (i) a first condition that permits the device to control a first electronic lock using the application to provide access to a first region within the property and (ii) a second condition that restricts the device from controlling a second electronic lock to restrict access to a second region within the property;
determining whether the submitted condition matches the first condition or the second condition; and
in response to determining whether the submitted condition matches the first condition or the second condition, configuring the application that is executing on a second device by transmitting, to the second device, one or more instructions that cause the application to:
a) provide access to the first region within the property in response the submitted condition matching the first condition, wherein providing access to the first region comprises sending, to the first electronic lock, an instruction that causes the first electronic lock to switch from a locked state to an unlocked state, and
b) determine that the application cannot provide access to the second region within the property in response the submitted condition matching the second condition.

16. The non-transitory storage device of claim 15, wherein the access credential comprises an alphanumeric code.

17. The non-transitory storage device of claim 15, wherein the access credential is valid during a period during which the user has access to the first region of the property.

18. The non-transitory storage device of claim 15, wherein the access credential specifies access to one or more electronic devices associated with a monitoring system of the property through the application.

19. The non-transitory storage device of claim 15, wherein the application enables exchange of communications with one or more devices associated with a monitoring system of the property.

20. The non-transitory storage device of claim 15, wherein the operations further comprise:
in response to receipt of the request to list the property and without requiring the user to create the new account or user login for the application, generating the account data that includes the access credential; and
in response to receipt of a reservation request for the property, storing, as part of the account data, the identifier for the device associated with the user.

* * * * *